(12) United States Patent
Kusumi et al.

(10) Patent No.: US 6,693,565 B2
(45) Date of Patent: Feb. 17, 2004

(54) POSITION TRANSDUCER

(75) Inventors: Masaaki Kusumi, Kanagawa (JP);
Michio Okano, Kanagawa (JP);
Shigeru Ishimoto, Kanagawa (JP);
Mitsuru Ohno, Kanagawa (JP); Yasuo Nekado, Kanagawa (JP)

(73) Assignee: Sony Precision Technology Inc., Tokyo (JP)

( * ) Notice: Subject to any disclaimer, the term of this patent is extended or adjusted under 35 U.S.C. 154(b) by 0 days.

(21) Appl. No.: 10/371,929

(22) Filed: Feb. 21, 2003

(65) Prior Publication Data
US 2003/0187609 A1 Oct. 2, 2003

(51) Int. Cl.$^7$ ................................................ H03M 1/30
(52) U.S. Cl. .............................................. 341/11; 341/9
(58) Field of Search ............................. 341/7, 8, 9, 11, 341/13

(56) References Cited
U.S. PATENT DOCUMENTS 5,438,330 A * 8/1995 Yamazaki et al. ............ 341/11

* cited by examiner

Primary Examiner—Jean Jeanglaude
Assistant Examiner—Joseph Lauture
(74) Attorney, Agent, or Firm—Haverstock & Owens LLP

(57) ABSTRACT

There is provided a position transducer (1) capable of accurately detecting an n-bit code by n ABS detectors from one ABS track. When an INC value is under j or over k, signal output from each of the ABS detectors is binarized based on a threshold h and also based on a threshold l. First, an ABS value decider (24) decides that a bit is "H" when it has been judged as being "H" on the basis of both the thresholds and a bit is "L" when it is has been judged as being "L" on the basis of both the thresholds. When the INC value is under j, a lower bit has the same code as that of the deiced bit. So, the ABS value decider (24) decides that the lower bit is "H" or "L". On the other hand, when the INC value is over k, an upper bit has the same code as the decided code. Thus, the ABS value decider (24) decides that the upper bit is "H" or "L". The ABS value decider (24) decides a yet-to-decide bit to be "L" when a bit adjacent to the bit is "H", and "H" when the adjacent bit is "L".

2 Claims, 16 Drawing Sheets

| bit | RESULT OF BINARIZATION BY H | RESULT OF BINARIZATION BY L | DECISION BY ABS VALUE DECIDER | Flag |
|---|---|---|---|---|
| 0 | L | H | | |
| 1 | L | H | L | 1(H) |
| 2 | L | L | L | 1(H) |
| 3 | L | H | | |
| 4 | L | H | | |
| 5 | L | H | H | 1(H) |
| 6 | H | H | H | 1(H) |
| 7 | L | H | | |

FIG.9

| bit | RESULT OF BINARIZATION BY H | RESULT OF BINARIZATION BY L | DECISION BY ABS VALUE DECIDER | Flag |
|---|---|---|---|---|
| 0 | L | H | | |
| 1 | L | H | L | 1(H) |
| 2 | L | L | L | 1(H) |
| 3 | L | H | | |
| 4 | L | H | | |
| 5 | L | H | H | 1(H) |
| 6 | H | H | H | 1(H) |
| 7 | L | H | | |

FIG.10

| bit | RESULT OF BINARIZATION BY H | RESULT OF BINARIZATION BY L | DECISION BY ABS VALUE DECIDER | Flag |
|---|---|---|---|---|
| 0 | L | H | H | 1(H) |
| 1 | L | H | L | 1(H) |
| 2 | L | L | L | 1(H) |
| 3 | L | H | H | 1(H) |
| 4 | L | H | L | 1(H) |
| 5 | L | H | H | 1(H) |
| 6 | H | H | H | 1(H) |
| 7 | L | H | L | 1(H) |

FIG.11

| bit | RESULT OF BINARIZATION BY H | RESULT OF BINARIZATION BY L | DECISION BY ABS VALUE DECIDER | Flag |
|---|---|---|---|---|
| 0 | L | H | | |
| 1 | L | H | | |
| 2 | L | L | L | 1(H) |
| 3 | L | H | L | 1(H) |
| 4 | L | H | | |
| 5 | L | H | | |
| 6 | H | H | H | 1(H) |
| 7 | L | H | H | 1(H) |

FIG.12

| bit | RESULT OF BINARIZATION BY H | RESULT OF BINARIZATION BY L | DECISION BY ABS VALUE DECIDER | Flag |
|---|---|---|---|---|
| 0 | L | H | L | 1(H) |
| 1 | L | H | H | 1(H) |
| 2 | L | L | L | 1(H) |
| 3 | L | H | L | 1(H) |
| 4 | L | H | H | 1(H) |
| 5 | L | H | L | 1(H) |
| 6 | H | H | H | 1(H) |
| 7 | L | H | H | 1(H) |

POSITION TRANSDUCER

BACKGROUND OF THE INVENTION

1. Field of the Invention

The present invention relates to a position transducer used in the fields of machine tools, industrial machinery, etc. to detect a position changed due to a rectilinear movement, rotational movement or the like.

This application claims the priority of the Japanese Patent Application No. 2002-059265 filed on Mar. 5, 2002, the entirety of which is incorporated by reference herein.

2. Description of the Related Art

The position transducers used in th fields of machine tools, industrial machinery, etc. to detect a position changed due to a rectilinear movement or the like are known from the disclosure in the Japanese Unexamined Application Publication Nos. 99564 of 1985, 177019 of 1988, 152314 of 1989, etc.

Referring now to FIG. 1, there is schematically illustrated in the form of a block diagram a conventional position transducer with one absolute track. The position transducer is generally indicated with a reference 120. As shown, the position transducer 120 is composed of a one-track absolute track 121 and an ABS head 124 including n absolute track detectors $123_1$, $123_2$, . . . , $123_n$. It should be noted that in the following explanation, the absolute track will be referred to as "ABS track" and the ABS track detector be referred to as "ABS detector".

The ABS track 121 is formed from a pattern in which micro-areas each represented by "0" and ones each represented by "1" are laid in array according to an n-order cyclic code. The micro-area represented by "0" and one represented by "1" are different in physical property from each other. For example, for the position transducer 120 to magnetically detect the position of the ABS head 124, the micro-areas "1" are magnetized but the micro-areas "0" are not.

The ABS head 124 is movable longitudinally of the ABS track 121 as indicated by an arrow Y in FIG. 1. Each of the ABS detectors $123_1$ to $123_n$ is provided in a position opposite to the ABS track 121. Also, when the micro-areas are laid at a pitch $\lambda$, the ABS detectors $123_1$ to $123_n$ are spaced a distance $\lambda$ corresponding to the micro-area pitch $\lambda$ from each other.

In the aforementioned position transducer 120, since the ABS track 121 is formed as the pattern in which the micro-areas each represented by "0" and ones each represented by "1" are laid in array according to the n-order cyclic code, as the ABS head 124 moves in relation to the ABS track 121, the ABS head 124 will detect ABS values all different from each other irrespectively of the fact that only the ABS track 121 is included in the position transducer 120. Therefore, the position transducer 120 can detect the position of the ABS head 124 in relation to the ABS track 121 on the basis of the ABS values detected by the ABS head 124.

The position transducer 120 can have the ABS track 121 reduced in size in a direction indicated by an arrow Z in FIG. 1 because it has only one ABS track 121. That is, the position transducer 120 can be designed smaller.

In the position transducer 120 having only the ABS track 121, when the position of the ABS head 124 varies, signals outputs from two or more of the ABS detectors $123_1$ to $123_n$ will possibly be switched from one to another. Specifically, signal outputs from two or more of the ABS detectors $123_1$ to $123_n$ are switched from "0" to "1" or vice versa.

It is difficult to provide all the ABS detectors $123_1$ to $123_n$ having quite the same capability of detecting a physical property and outputting a signal. Also it is difficult to provide all the micro-areas spaced at quite the same pitch $\lambda$ (as shown in FIG. 1) from each other when producing the ABS track 121.

Therefore, when each of the ABS detectors $123_1$ to $123_n$ is opposite to near the edge of a micro-area, it is difficult for the ABS head 124 to accurately detect a code from the ABS track 121 because the ABS detectors $123_1$ to $123_n$ output signals at different times, respectively.

Also, when each of the ABS detectors $123_1$ to $123_n$ is opposite to near the edge of a micro-area, the physical property to be detected is influenced by an adjacent micro-area. For example, when the ABS detector $123_1$ detects a magnetized micro-area near the edge and an adjacent micro-areas is not magnetized, it will only detect a weak magnetic field and thus output a small signal.

Namely, when each of the ABS detectors $123_1$ to $123_n$ is opposite to near the edge of a micro-area, the position transducer 120 can hardly detect, with accuracy, the position of the ABS head 124 in relation to the ABS track 121.

Position transducers capable of detecting the position of the ABS head in relation to the ABS track without error include two types which will be described below.

The first one of the two types of position transducers is disclosed in the Japanese Unexamined Application Publication No. 1990-21216, Japanese Patent No. 2679207 and Japanese Unexamined Application Publication No. 1989-152314, respectively. This position transducer detects no signal output from each of the ABS detectors that is opposite to near the edge of a micro-area but detects signal output from each of the ABS detectors that is opposite to near the center of the micro-area (which area will be referred to as "stable area" hereunder).

FIG. 2 is also a block diagram of a variant of the aforementioned conventional position transducer. This conventional position transducer is generally indicated with a reference 140. As shown, in the position transducer 140, an incremental track 142 whose physical property changes in a constant cycle is juxtaposed with the ABS track 121. Also, the position transducer 140 includes, in addition to the ABS head 124, an incremental track head 144 having two incremental track detectors $143_1$ and $143_2$.

The position transducer 140 is adapted such that judging from a signal output from the incremental track head 144 that each of the ABS detectors $123_1$ to $123_n$ is opposite to the stable area, it detects signal outputs from the ABS detectors $123_1$ to $123_n$.

When each of the ABS detectors $123_1$ to $123_n$ is not opposite to any stable area, however, the aforementioned position transducer 140 cannot detect any position of the ABS head 124 in relation to the ABS track 121.

Therefore, for example, to detect the position of the ABS head 124 in relation to the ABS track 121 the moment the power is applied to the position transducer 140, each of the ABS detectors $123_1$ to $123_n$ have to be opposite to the stable area at that moment. If none of the ABS detectors $123_1$ to $123_n$ are opposite to their respective stable areas, the position transducer 140 cannot detect any position of the ABS head 124 in relation to the ABS track 121 before the ABS head 124 is moved until each of the ABS detectors $123_1$ to $123_n$ moves into the stable area. Namely, the position transducer 140 can hardly detect the position of the ABS head 124 in relation to the ABS track 121 the movement it is applied with the power.

The second type of position transducer is disclosed in the Japanese Patent Nos. 2571393, 2571394, 3063044 and 3103266. The positional transducer includes n sets of ABS detectors, each set including two ABS detectors. In this position transducer, signal output from one of the two ABS detectors that is opposite to the stable area is used to detect an ABS value.

In this position transducer, however, the ABS head includes 2n ABS detectors to detect an n-bit code indicating an ABS value. That is, the position transducer will have a larger number of ABS detectors for the number of bits in a code the ABS head detects. Since many ABS detections are made in the position transducer, the ABS detectors will possibly be large and corresponding addition of wires and the like will possibly cause the circuit to be more complicated. Therefore, this position transducer can hardly be designed compact. Also, since this position transducer is produced through many steps, it is difficult to produce it with less costs.

OBJECT AND SUMMARY OF THE INVENTION

It is therefore an object of the present invention to overcome the above-mentioned drawbacks of the related art by providing a position transducer capable of accurately detecting an n-bit code by an absolute track head including n absolute track detectors even when it includes one absolute track and also capable of detecting the position of the absolute track head in relation to the absolute track independently of the position of each absolute track detector.

The above object can be attained by providing a position transducer including according to the present invention:

an absolute track in which micro-areas each represented by "0" and those each represented by "1" when two types of micro-areas different in physical property from each other are represented by either of two codes "0" and "1" are laid in array to provide an n-bit code (n is a natural number);

an incremental track whose physical property varies in a constant cycle;

an absolute track head having n detectors laid in array oppositely to the absolute track and which is movable in relation to the absolute track to detect the physical property of the absolute track;

an incremental track head having detectors opposite to the incremental track to detect the physical property of the incremental track;

a sorting means for binarizing the values of signal outputs from the absolute track detectors to "H" and "L" based on a first threshold h and also to "H" and "L" based on a second threshold l (h>l) and then sorting the signal values into ones having been judged as being "H" or "L" both when the signal outputs are binarized based on the first threshold h and when they are binarized based on the second threshold l and ones having been judged as being "L" when they are binarized based on the first threshold h and as being "H" when they are binarized based on the second threshold l;

an interpolation means for segmenting, within a micro-area, the position of the absolute track head in relation to the absolute track given by the n-bit code on the basis of the signal output from the incremental track detector; and a code deciding means for deciding the n-bit code based on the signal having been judged by the sorting means as being under than l or over h and the result of the segmentation by the interpolation means.

These objects and other objects, features and advantages of the present invention will become more apparent from the following detailed description of the preferred embodiments of the present invention when taken in conjunction with the accompanying drawings.

BRIEF DESCRIPTION OF THE DRAWINGS

FIG. 9 shows results of binarization of output from each ABS head by a threshold h and those of binarization of output from each ABS head by a threshold l;

FIG. 10 shows decision of lower ones of bits judged as being "H" or "L" when the INC value is under j;

FIG. 11 shows decision of all bits when the INC value is under j;

FIG. 12 shows decision of lower ones of bits judged as being "H" or "L" when the INC value is over k;

FIG. 13 shows decision of all bits when the INC value is over k;

FIG. 18 shows a maximum periodic series generated by an eight-order primitive polynominal taking "10101010" as an initial value.

DETAILED DESCRIPTION OF THE PREFERRED EMBODIMENTS

The position transducer according to the present invention will be described concerning a linear encoder as an embodiment thereof with reference to FIGS. 3 to 15.

The linear encoder is generally indicated with a reference 1. As shown, the linear encoder 1 includes an absolute track (will be referred to as "ABS track" hereunder) 2, incremental track (will be referred to as "INC track" hereunder) 3, absolute track head (will be referred to as "ABS head" hereunder) 5, incremental track head (will be referred to as "INC head" hereunder) 6 and an absolute position detector 7.

The ABS track 2 is a pattern in which micro-areas each represented by "0" and those each represented by "1" are laid in array according to a cyclic code. One micro-area indicates one bit of the code. In this embodiment, the cyclic code is a a maximum periodic series generated by an eight-order primitive polynoininal. That is, the ABS track 2 has such a pattern that when an 8-bit code is sequentially read from the ABS track 2 while being moved bit by bit, the same 8-bit code will not take place again within an effective length of measurement. It should be noted that the micro-areas are laid with a pitch $\lambda$ ($\lambda$>0).

Figure 1:
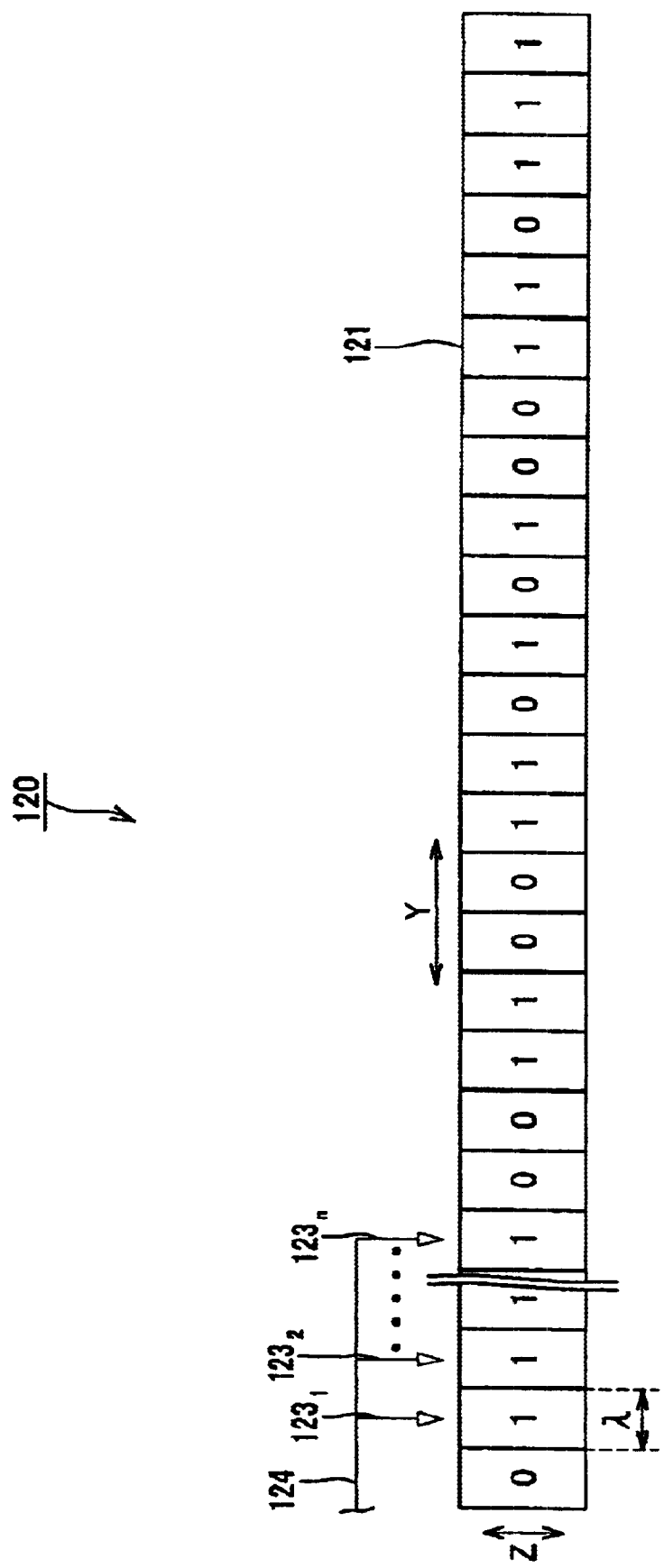
FIG. 1 is a block diagram of a conventional position transducer with one absolute track.
Figure 2:
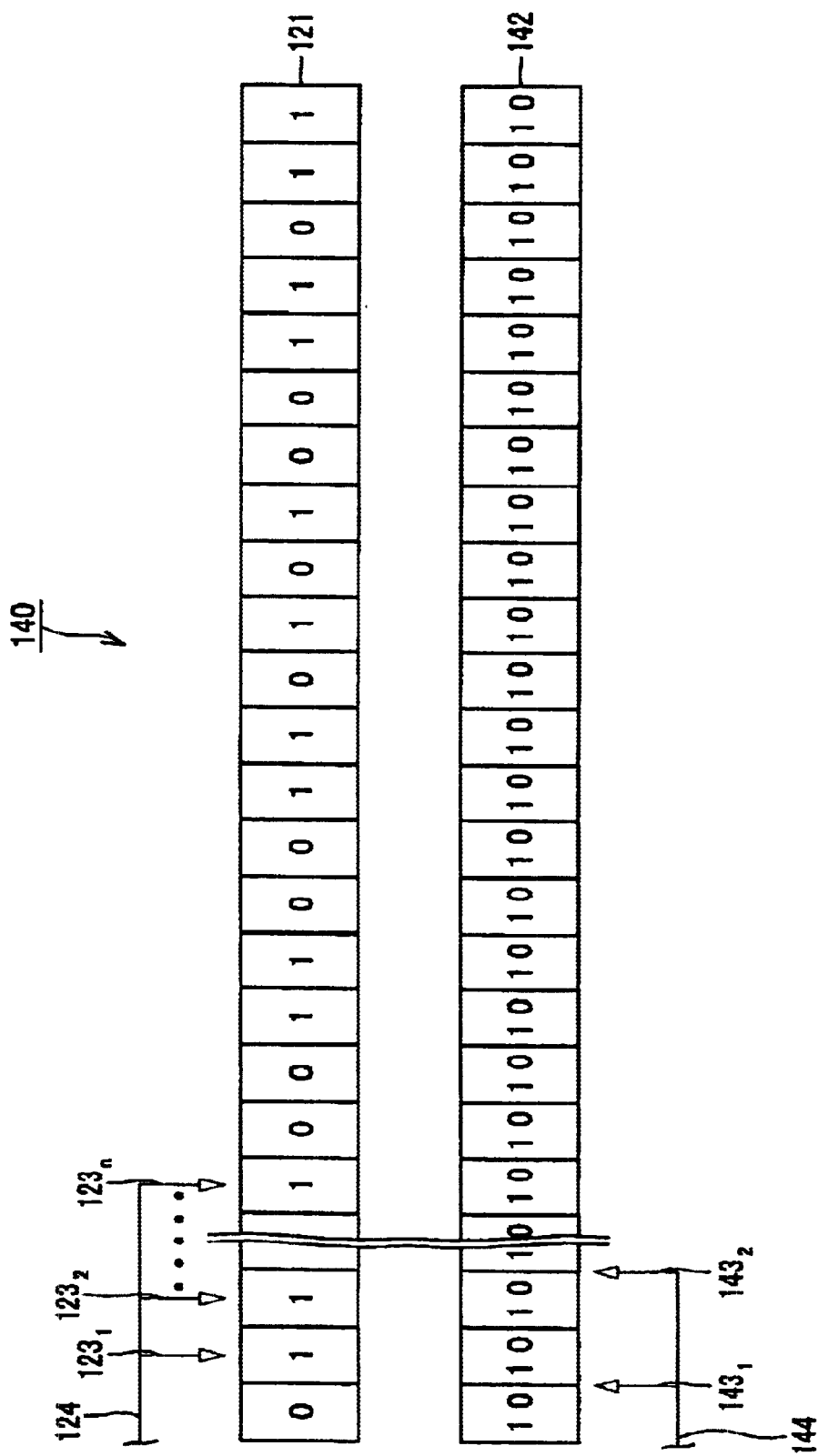
FIG. 2 is also a block diagram of a variant of the conventional position transducer in FIG. 1, which has one absolute track and also an incremental track juxtaposed with the absolute track.
Figure 3:
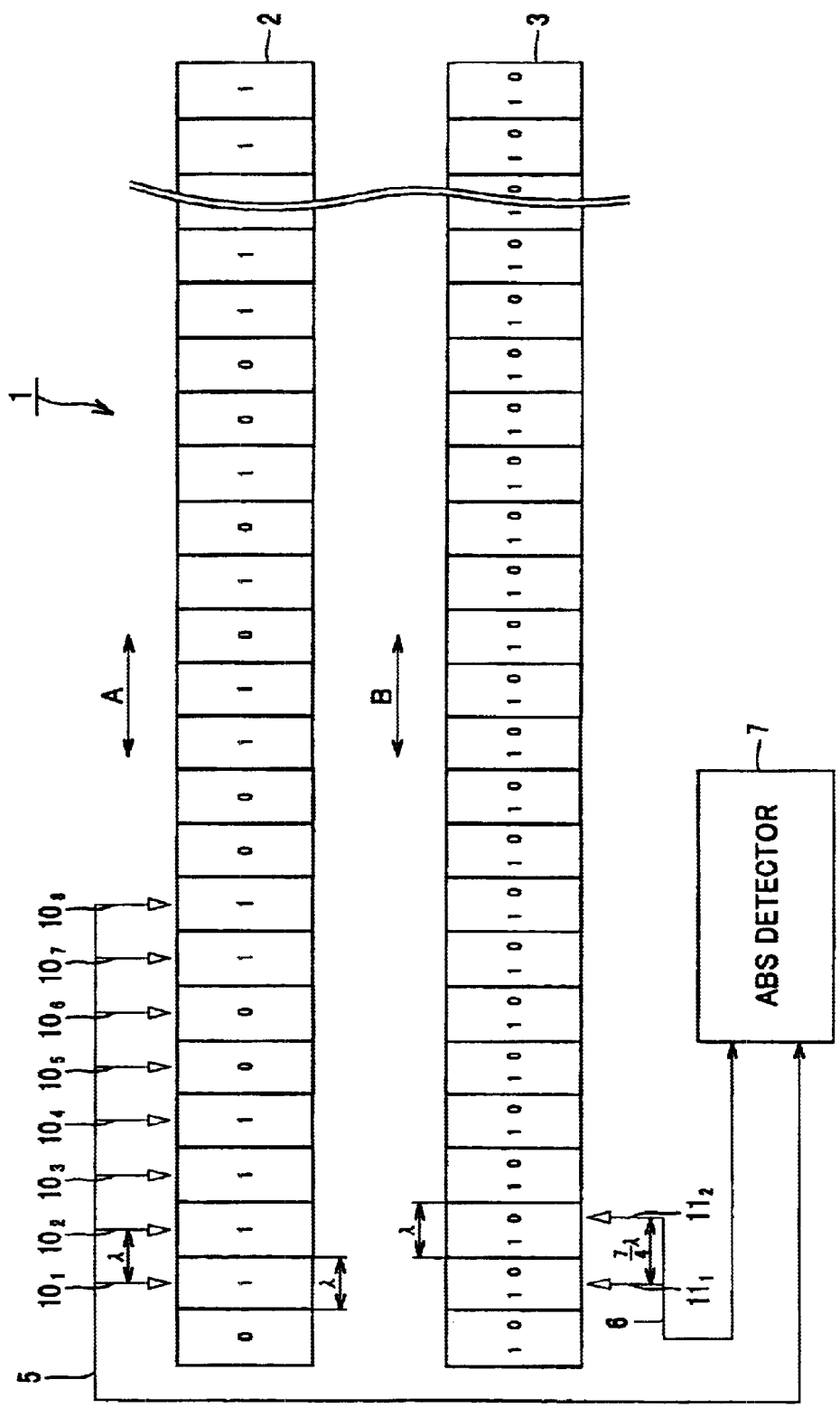
FIG. 3 schematically illustrates the position transducer according to the present invention.

Also, near the boundary between a micro-area and an adjacent one, there will be formed an area which will be influenced by the adjacent micro-area. In the following explanation, the area influenced by the adjacent area will be referred to as "unstable area" and an area not influenced by adjacent area will be referred to as "stable area". The length of an unstable area, extending longitudinally of the ABS track 2 and indicated with an arrow A in FIG. 3, is assumed to be $\delta$.

The INC track 3 is a patten in which its physical property varies in a cycle of wavelength $\lambda/2$, and it is juxtaposed to the ABS track 2.

The ABS head 5 detects the 8-bit code from the ABS track 2. It should be noted that in the following explanation, the 8-bit code detected by the ABS head 5 will be referred to as "ABS value". The ABS head 5 is provided to be movable longitudinally of the ABS track 2 as indicated with the arrow A in FIG. 3. The ABS head 5 includes eight absolute track detectors $10_1$, $10_2$, ... $10_8$. It should be noted that the absolute track detector will be referred to as "ABS detector".

The ABS detectors $10_1$ to $10_8$ are laid in array longitudinally of the ABS track 2. It should be noted that the ABS detectors $10_1$ to $10_8$ are laid with the same intervals as the pitch $\lambda$ of the micro-areas. Also, the ABS detectors $10_1$ to $10_8$ are provided for the detection surface thereof not to be in contact with the ABS track 2.

Each of the ABS detectors $10_1$ to $10_8$ outputs a signal indicative of a logical value "1" (will be referred to as "1" signal hereunder) when it is opposite to a micro-area represented by "1", while outputting a signal indicative of a logical value "0" (will be referred to as "0" signal hereunder) when it is opposite to a micro-area represented by "0". However, when each of the ABS detectors $10_1$ to $10_8$ is opposite to an unstable area near the boundary between a micro-area represented by "1" and a one represented by "0", it will provide an unstable output because the adjacent micro-areas will have an influence on the unstable area, so that it can hardly output definite "1" and "0" signals. Each of the ABS detectors $10_1$ to $10_8$ detects a code in each bit in the ABS value by detecting information from the ABS track 2.

Note that in this embodiment, the ABS detector $10_1$ detects the 0-th bit of the code ABS detector $10_2$ detects the first bit, ABS detector $10_3$ detects the second bit, the ABS detector $10_4$ detects the third bit, ABS detector $10_5$ detects the fourth bit, ABS detector $10_6$ detects the fifth bit, ABS detector $10_7$ detects the sixth bit, and the ABS detector $10_8$ detects the seventh bit. Thus, the ABS detector 5 detects the 8-bit code.

The INC head 6 is provided to be movable longitudinally of the INC track 3 as indicated with an arrow B in FIG. 3, and also along with the ABS head 5. The INC head 6 includes two incremental track detectors (will be referred to as "INC detector" hereunder) $11_1$ and $11_2$. Further, each of the INC detectors $11_1$ and $11_2$ is provided for the detection surface thereof not to be in contact with the INC track 3.

Each of the INC detectors $11_1$ and $11_2$ detects information from the INC track 3. In the linear encoder 1, the absolute position detector 7 makes computation based on the information detected by the INC detectors $11_1$ and $11_2$ to know from which micro-area part in the ABS track 2 the ABS detectors $10_1$ to $10_8$ have detected the information.

Note that in this embodiment, the interval between the INC detectors $11_1$ and $11_2$ is $7/4\lambda$. Because of this interval, there will be a phase difference of $\pi/2$ between detection signal outputs from the INC detectors $11_1$ and $11_2$.

Figure 4:
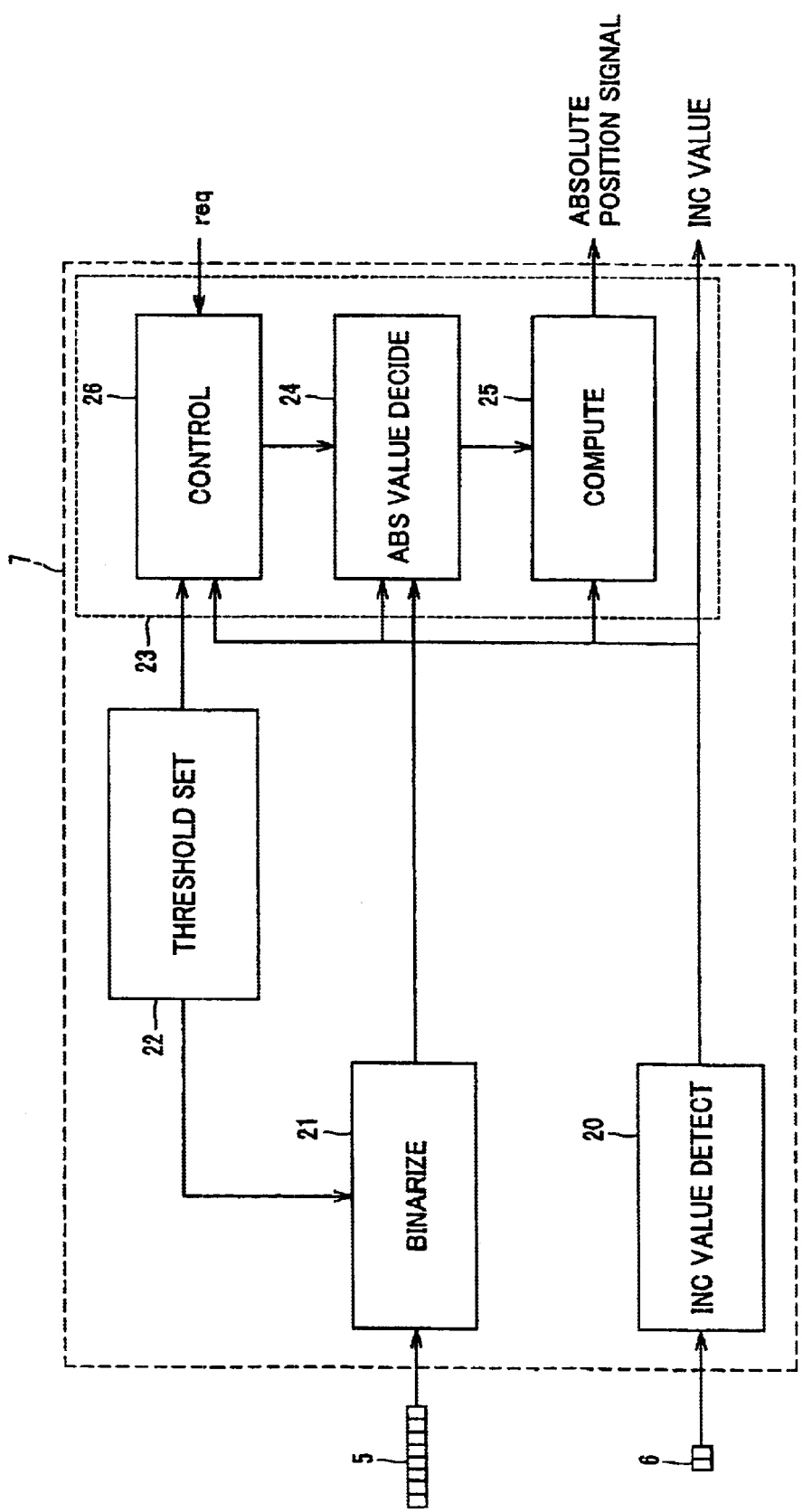
FIG. 4 is a block diagram of an absolute position transducer in the position transducer in FIG. 3.

As shown in FIG. 4, the absolute position detector 7 includes an INC value detector 20, binarization block 21, threshold setter 22 and a control/computation unit 23.

Figure 5:
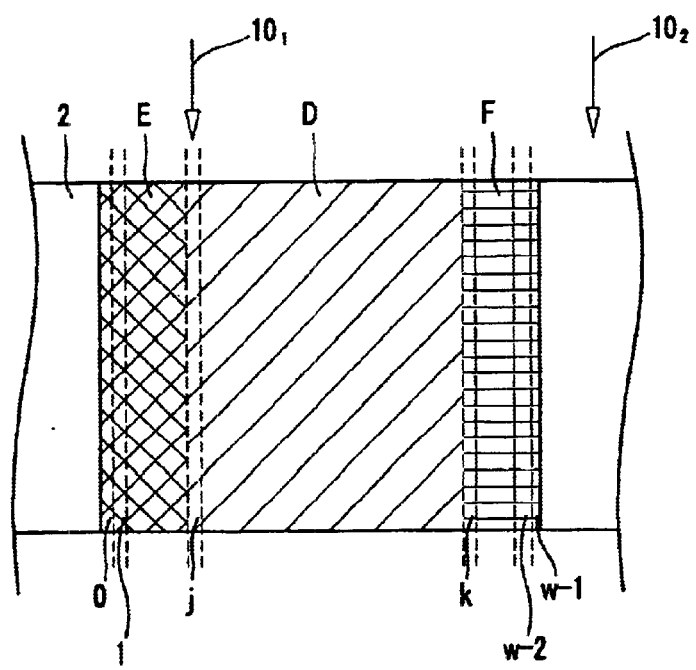
FIG. 5 schematically illustrates an INC value, stable area, and first and second unstable areas.

The INC value detector 20 detects an INC value based on the information detected by the INC detectors $11_1$ and $11_2$. The INC value indicates from which micro-area parts in the ABS track 2 the ABS detectors $10_1$ to $10_8$ have detected the information. As shown in FIG. 5, the micro-area is divided into w equal parts (w is a natural number) longitudinally of the ABS track 2, and the w equal parts are sequentially numbered 0, 1, 2 , . . . , w–1 as INC values from one end of the ABS track 2. It should be noted that in this embodiment, the equal divisions of a micro-area is numbered 0, 1, 2, . . . , w–1 as INC values in the direction from the ABS detector $10_1$, toward the ABS detector $10_2$.

With the introduction of such INC values, when an INC value is over j and under k (j and k are natural numbers and j<k<w), for example, it is evident that the ABS detectors $10_1$ to $10_8$ have detected the information from near the center of the micro-area in the ABS track 2, as indicated with a reference D in FIG. 5. On the other hand, when the INC value is under j, it will be clear that the ABS detectors $10_1$ to $10_8$ have detected the infonnation from an unstable area at an "INC=0" side of the micro-area in the ABS track 2 (will be referred to as "first unstable area" hereunder), as indicated with a reference E in FIG. 5. Further, when the INC value is over k, it will be known that the ABS detectors $10_1$ to $10_8$ have detected the information from an unstable micro-area at an "INC=w" side of the micro-area in the ABS track 2 (will be referred to as "second unstable area" hereunder), as indicated with a reference F in FIG. 5. The values j and k are set according to the accuracy of the linear encoder 1 and infonnation-detection characteristics of the ABS detectors $10_1$ to $10_8$ and INC detectors $11_1$ and $11_2$. It should be noted that the INC value depends upon the method disclosed in the Japanese Patent No. 2571394, for example.

The binarization block 21 is formed from a comparator, for example. It binarizes an output from each of the ABS detectors $10_1$ to $10_8$ to "H" and "L" based on a threshold. In this embodiment, an output larger than the threshold is taken as "H" while a one smaller than the threshold is taken as "L". It should be noted that an output larger than the threshold may be taken as "H" while a one smaller than the threshold be taken as "L". Also, the above "H" and "L" may be swapped between them.

In the binarization block 21, when the threshold used for the binarization varies depending upon the INC value. For example, when the INC value is over j and under k, namely, when each of the ABS detectors $10_1$ to $10_8$ is opposite to a stable area, output from each of the ABS detectors $10_1$ to $10_8$ is binarized on the basis of a threshold a. Also, when the INC value is under j and over k, that is, when each of the ABS detectors $10_1$ to $10_8$ is opposite to the first or second unstable area, output from each of the ABS detectors $10_1$ to $10_8$ is binarized on the basis of a threshold h, and also based on a threshold l. It should be noted that a, h and l are natural numnbers and in a relation of 1<a<h with each other.

The threshold setter 22 sets the threshold for the binarization block 21 to any of a, h and l under the control of a control block which will further be described later.

As shown in FIG. 4, the control/computation unit 23 includes an ABS decision block 24, computation block 25 and a control block 26.

The ABS value decider 24 includes a CPU, RAM, ROM, etc. (not shown). It should be noted that the ROM has stored therein data indicative of a relation between an ABS value detected by the ABS head 5 and a sectional absolute position signal representing a position of the ABS head 5 in relation to the ABS track 2 by a section. The ABS value decider 24 decides an ABS value on the basis of the data binarized by the binarization block 21 and INC value detected by the INC value detector 20, and then converts the ABS value into a sectional absolute position signal according to the data stored in the ROM. It should be noted that the method the ABS decision block 24 adopts to decide an ABS value varies depending upon whether the INC value is over j and under k or whether it is under j or over k. The method of deciding an ABS value by the ABS value decider 24 will be described in detail later.

The computation block 25 adds the INC value and sectional absolute position signal together and outputs the result. By adding the INC value and sectional absolute position signal together, the computation block 26 will provide an absolute position signal indicating a position of the ABS head 5 in relation to the ABS track 2 with an accuracy of 1/w of the sectional absolute position signal.

The control block 26 controls the threshold setter 22, ABS value decider 24, etc. For example, the control block 24 operates the threshold setter 22 and ABS value decider 24 according to an external ABS value detect command signal indicated with a reference "req" as shown in FIG. 4. Also, the control block 26 controls, based on the INC value, the threshold the threshold setter 22 sets for the binarization block 21. More particularly, when the INC is over j and under k, the control block 26 sets the threshold for the binarization block 21 to a. When the INC value is under j and over k, it will sets the threshold for the binarization block 21 to h. After binarization with the threshold h is complete, the control block 26 will set the threshold for the binarization block 21 to l. Further, the control block 26 controls the operation of the ABS value decider 24 depending upon whether the INC value is over j and under k or whether the INC value is under j and over k.

There will be described in detail below how the ABS value decider 24 decides an ABS value and converts the ABS value into a sectional absolute position signal.

It is considered that when the INC value is over j and under k, the ABS detectors $10_1$ to $10_8$ are opposite to the stable areas so that the ABS values can accurately be detected by the ABS head 5. Therefore, the ABS value decider 24 will decide that an ABS detector whose output signal has been judged by the binarization block 21 as being "H" has outputted "1" signal while an ABS detector whose output signal has been judged by the binarization block 21 as being "L" has outputted "0" signal. Then, the ABS value decider 24 will takes, as an ABS value, a code resulted from conversion of "H" into "1" and "L" into "0". The ABS value will be converted into a sectional absolute position signal on the basis of the data stored in the ROM.

On the other hand, it is considered that when the INC value is under j, each of the ABS detectors $10_1$ to $10_8$ is opposite to the first unstable area, while when the INC value is over k, each of the ABS detectors $10_1$ to $10_8$ is opposite to the second unstable area. Therefore, when the INC value is under j, the ABS value decider 24 will operate as will be described below.

First, the ABS value decider 24 makes a comparison between a result of binarization taking h as the threshold and a result of binarization taking l as the threshold. Then, the ABS value decider 24 decides that a bit having been detected by the ABS detector and judged as being "H" both when the binarization is made taking h as the threshold and when the binarization is made taking l as the threshold, is "H", and judges the bit as being "1". Also, the ABS value decider 24 decides that a bit having been detected by the ABS detector and judged as being "L" both when the binarization is made taking h as the threshold and when the binarization is made taking l as the threshold, is "L", and judges the bit as being "0".

The ABS detector having detected a bit judged as being "H" or "L" will output a stable signal even when it is opposite to the first or second unstable area. It is considered that the ABS detector having detected a bit adjacent to two bits whose codes are different from that of the bit in consideration and opposite to the first or second unstable area will output an unstable signal without fail. Therefore, a bit judged as being "H" or "L" is considered to be adjacent to two code bits of which at least one has the same code as that of the bit in consideration. That is to say, it is considered that a bit judged as being "H" is adjacent to two bits of which at least one is "H". Namely, the detected "H" bit is preceded or followed by another "H" bit. Also, a bit judged as being "L" is considered to be adjacent to two bits of which at least one is "L". Namely, the detected "L" bit is preceded or followed by another "L" bit.

Note that a bit judged as being neither "H" nor "L" is considered to be adjacent to two bits of which at least one has a different code from that of the bit in consideration, namely, an inverted bit.

Figure 6:
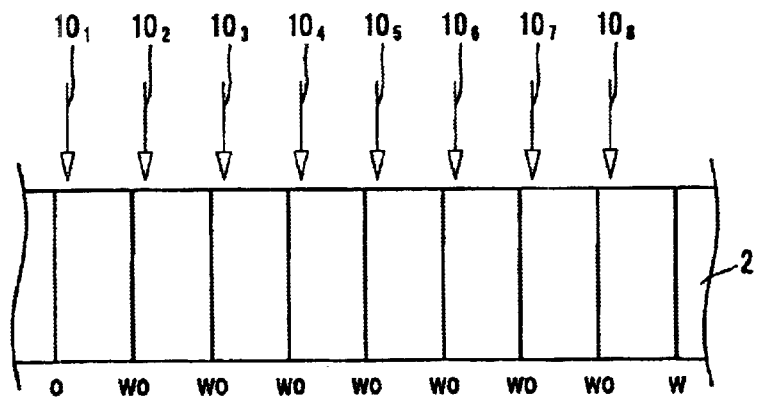
FIG. 6 schematically illustrates detection of a magnetic field by each ABS head at a side where the INC value is 0.

When the INC value is under j, each of the ABS detectors $10_1$ to $10_8$ is considered to have detected the infonnation from the first unstable area. As shown in FIG. 6, when the ABS detector detects information from the first unstable area, the infonnation is affected by a micro-area adjacent to the "INC=0" side, namely, a micro-area indicating a one-position lower bit (will be referred to as "lower bit" hereunder). When the ABS detect outputs "0" signal with the object micro-area being influenced by a micro-area indicating a lower bit, the micro-area indicating the lower bit is considered to be a one represented by "0". On the other hand, when the ABS detector outputs "1" signal with the object micro-area being influenced by a micro-area indicating a lower bit, the micro-area indicating the lower bit is also considered to be a one represented by "1". Therefore, when the INC value is under j, the lower bit of successive "H" bits is judged as being "H" and the lower bit of successive "L" bits is judged as being "L".

Then, the ABS value decider 24 decides all bits to be either "H" or "L" by deciding that a remaining undefined bit is "L" when it is adjacent to a bit having been decided to be "H" and has not yet been decided to be either "H" or "L" while deciding that a bit is "H" when it is adjacent to a bit having been decided as "L" and has not yet been decided to be either "H" or "L" and sequentially repeating this procedure for all the bits.

Finally, the ABS value decider 24 converts "H" into "1" and "L" into "0" to provide an ABS value. The ABS value decider 24 converts the ABS value into a sectional absolute position signal on the basis of the data stored in the ROM.

Figure 7:
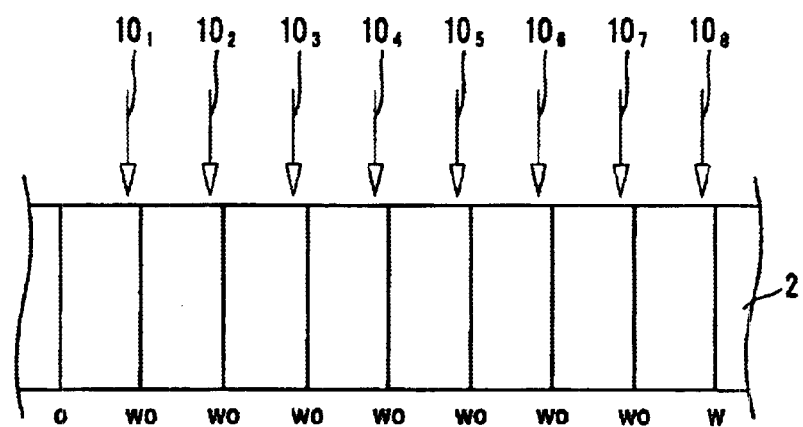
FIG. 7 schematically illustrates detection of a magnetic field by each ABS head at a side where the INC value is w.

On the other hand, when the INC value is over k, each of the ABS detectors $10_1$ to $10_8$ is considered to have detected the information from the second unstable area. As shown in FIG. 7, when the ABS detector detects information from the second unstable area, the information is affected by a micro-area adjacent to the "INC=w" side, namely, a micro-area indicating a one-position higher bit (will be referred to as "higher bit" hereunder). Wheen the ABS detect outputs "0" signal with the object micro-area being influenced by a micro-area indicating a higher bit, the micro-area indicating the higher bit is considered to be a one represented by "0". On the other hand, when the ABS detector outputs "1" signal with the object micro-area being influenced by a micro-area indicating a higher bit, the micro-area indicating the higher bit is also considered to be a one represented by "1". Therefore, when the INC value is under j, the higher bit of successive "H" bits is judged as being "H" and the higher bit of successive "L" bits is judged as being "L".

Then, the ABS value decider 24 decides all bits to be either "H" or "L" by deciding that a bit is "L" when it is adjacent to a bit having been decided to be "H" and has not yet been decided to be either "H" or "L" while deciding that a bit is "H" when it is adjacent to a bit having been decided to be "L" and has not yet been decided to be either "H" or "L" and sequentially repeating this procedure for all the bits.

Finally, the ABS value decider 24 converts "H" into "1" and "L" into "0" to provide an ABS value. The ABS value decider 24 converts the ABS value into a sectional absolute position signal on the basis of the data stored in the ROM.

Figure 8:
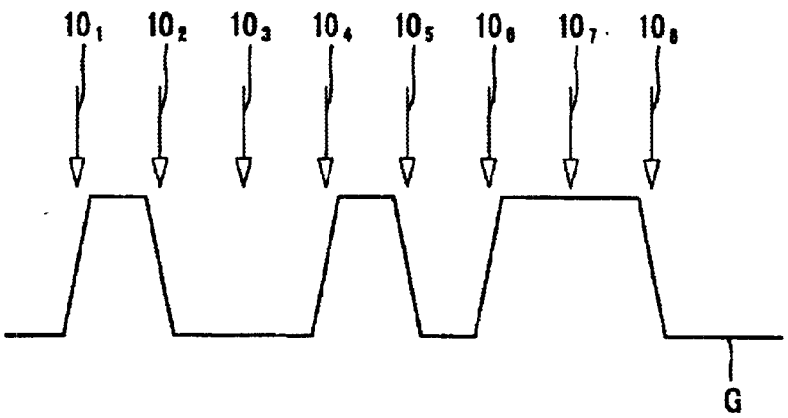
FIG. 8 explains the positional relation between a signal G and ABS head.

When the INC value is under j or over k, the ABS value decider 24 will operate as will be described in detail below. In the following explanation, it is assumed that the ABS detectors $10_1$ to $10_8$ have detected a signal G having a waveform as shown in FIG. 8 from the first of second unstable area on the ABS track 2.

First the binarization block 21 binarizes signal output from each of the ABS detectors $10_1$ to $10_8$ on the basis of the threshold h to judge that the signal output from the ABS detector $10_7$ is "H" and signal outputs from the ABS detectors $10_1$, $10_2$, . . . , $10_6$ and $10_8$ are "L", as shown in FIG. 9.

Next, the binarization block 21 binarizes signal output from each of the ABS detectors $10_1$ to $10_8$, on the basis of the threshold l to judge that the signal output from the ABS detector 103 is "H" and signal outputs from the ABS detectors $10_1$, $10_2$, $10_4$, $10_5$, . . . , $10_8$ are "L".

Then, the ABS value decider 24 makes a comparison between the result of the binarization based on the threshold h of the signal outputs from the ABS detectors $10_1$ to $10_8$ and the result of the binarization based on the threshold l of the signal outputs from the ABS detectors $10_1$ to $10_8$, and decides that the second bits in both the results having been judged as being "L" are successive "H" bits and the sixth bits in both the results having been judged as "H" are successive "L" bits.

Next, the ABS value decider 24 flags the second bits and sixth bits having been decided to be "H" or "L".

When the INC value is under j, the ABS value decider 24 decides that the first bit is "L" and the fifth bit is "H" as shown in FIG. 10. Then, the ABS value decider 24 flags the first and fifth bits.

Next, the ABS value decider 24 decides that the 0-th bit is "H", third bit is "H", fourth bit is "L" and the seventh bit is "L" as shown in FIG. 11. Then the ABS value decider 24 flags the 0-th, third, fourth and seventh bits.

Thus, the ABS value decider 24 decides that the ABS value is "10010110".

On the other hand, when the INC value is over k, the ABS value decider 24 decides that the third bit is "L" and the seventh bit is "H" as shown in FIG. 12. Then, the ABS value decider 24 flags the third and seventh bits.

Next, the ABS value decider 24 decides that the first bit is "H", 0-th bit is "L", fourth bit is "H" and the fifth bit is "L" as shown in FIG. 13. Then the ABS value decider 24 flags the first, 0-th, fourth and fifth bits.

Thus, the ABS value decider 24 decides that the ABS value is "01001011".

Figure 14:
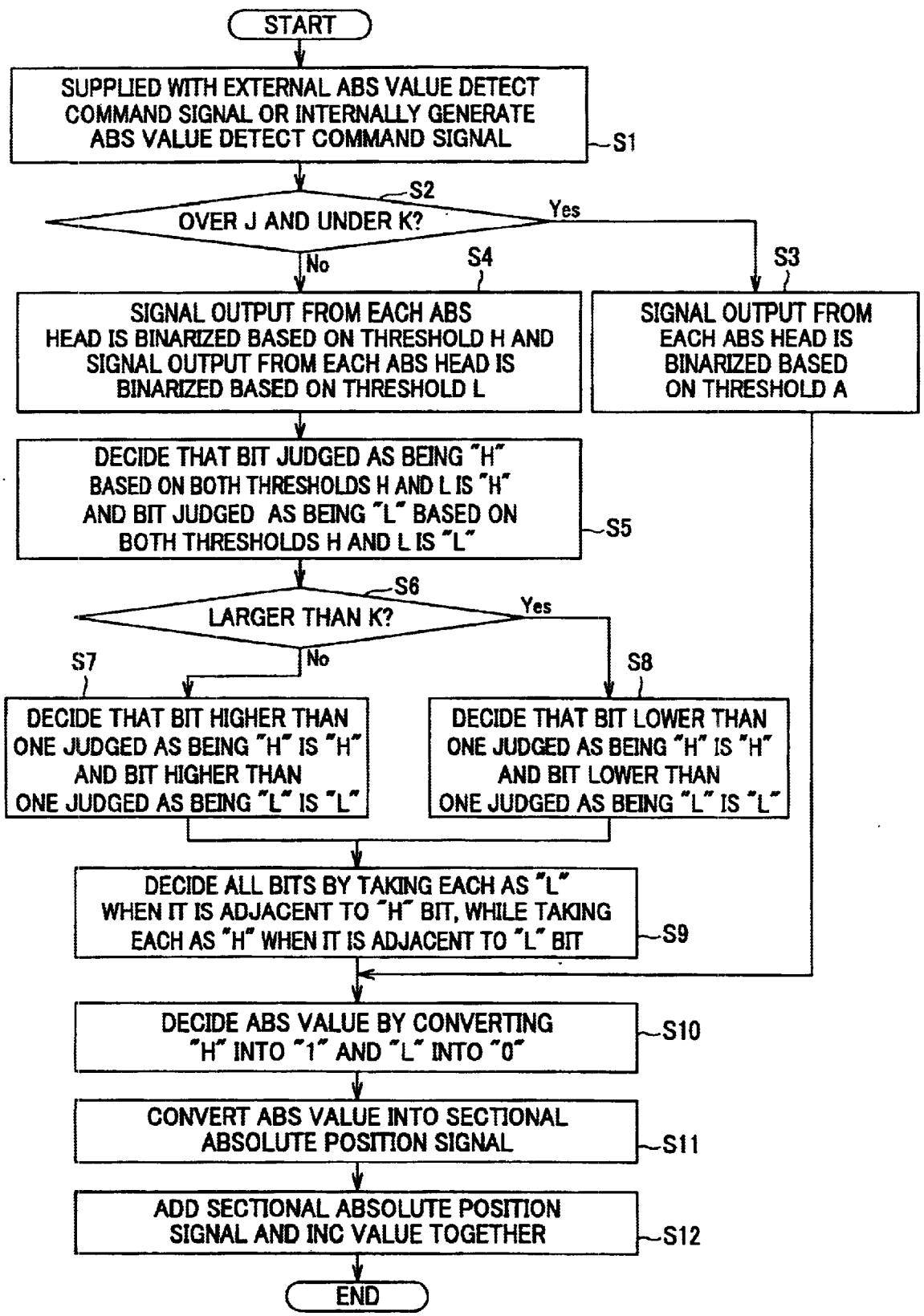
FIG. 14 shows a flow of operations made by the position transducer according to the present invention.

The linear encoder 1 having been described above functions as will be described below:

As shown in FIG. 14, first in step S1, the control block 26 is supplied with an external ABS value detect command signal or internally generates an ABS value detect command.

Next in step S2, the control block 26 judges whether the INC value decided by the INC value decider 20 is over j and under k. When the judgment is that the INC value is over j and under k, the control block 26 goes to step S3. If not, the control block goes to step S4.

In step S3, the threshold setter 21 sets the threshold for the binarization block 22 to a. Then, the binarization block 22 binarizes the signal outputs from the ABS detectors $10_1$, to $10_8$, to "H" and "L".

On the other hand, in step S4, the threshold setter 21 sets the threshold for the binarization block 22 to h, and then binarizes the signal outputs from the ABS detectors $10_1$, to $10_8$, to "H" and "L". Also, the threshold setter 21 sets the threshold for the binarization block 22 to 1, and then binarizes the signal outputs from the ABS detectors $10_1$ to $10_8$, to "H" and "L".

Then in step S5, the ABS value decider 24 decides that a bit is "H" when it has been judged as being "H" based on both the thresholds h and l and a bit is "L" when it has been judged as being "L" based on both the thresholds h and l.

Next in step S6, the control block 26 judges the INC value as being over k. When the INC value is over k, the control block 26 goes to step S7. When the INC value is under j, the control block 26 goes to step S8.

In step S7, the control block 26 decides that a bit is "H" when it is higher than a one having been decided to be "H" and a bit is "L" when it is higher than a one having been decided to be "L".

On the other hand, in step S8, the control block 26 will decide that a bit is "H" when it is lower than a one having been decided to be "H" and a bit is "L" when it is lower than a one having been decided to be "L".

Then in step S9, the control block 26 decides all bits to be either "H" or "L" by deciding that a bit is "L" when it is adjacent to a one having been decided to be "H" and has not yet been decided to be either "H" or "L" while deciding that a bit is "H" when it is adjacent to a one having been decided to be "L" and has no yet been decided to be either "H" or "L".

Next in step S10, the ABS value decider 24 decides an ABS value by converting "H" at each bit having been acquired in step S3, S7 or S8 into "1" and "L" so acquired into "0".

In step S11, the ABS value decider 24 converts the ABS value into a sectional absolute position signal on the basis of the data stored in the ROM.

Then in step S12, the computation block 25 adds the sectional absolute position signal and INC value together.

The ABS track 2 is formed from a pattern of "1" and "0" laid alternately in array thereon at a maximum of 8 or 9 bits according to the cyclic code used. An 8-bit pattern has an array like "10101010" or "01010101". When such arrays are laid continuously, they will take a form like "010101010" or "101010101", respectively, in some cases.

Figure 15A:
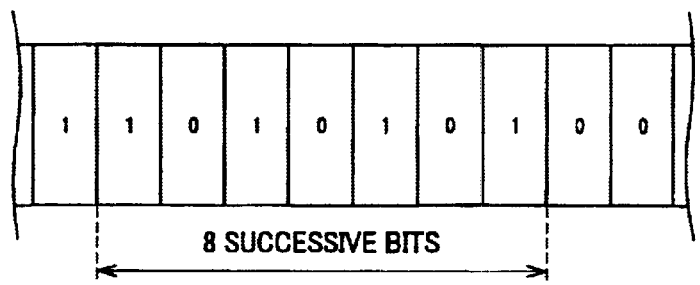
FIG. 15 shows "1" and "0" alternately laid in 8 successive bits.
Figure 15B:
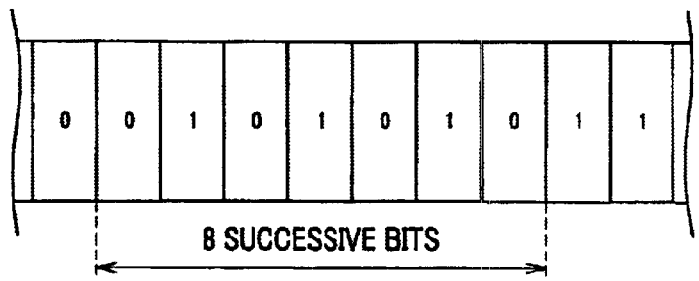

As shown in FIGS. 15(A) and 15(B), when "1" and "0" are laid in an 8-bit pattern, the first bit or eighth bit takes the same code as for the adjacent micro-area. That is, the ABS value decider 24 can decide that the first bit is "H" or "L", when each of the ABS detectors $10_1$ to $10_8$ detects information from the first unstable area, and also can decide that the eighth bit is "H" or "L", when each of the ABS detectors $10_1$ to $10_8$, detects information from the second unstable area. Therefore, the ABS value decider 24 can always decide an ABS value when the ABS track 2 is formed as a pattern in which "1" and "0" are laid in array at a maximum of 8 bits according to the cyclic code.

Figure 16A:
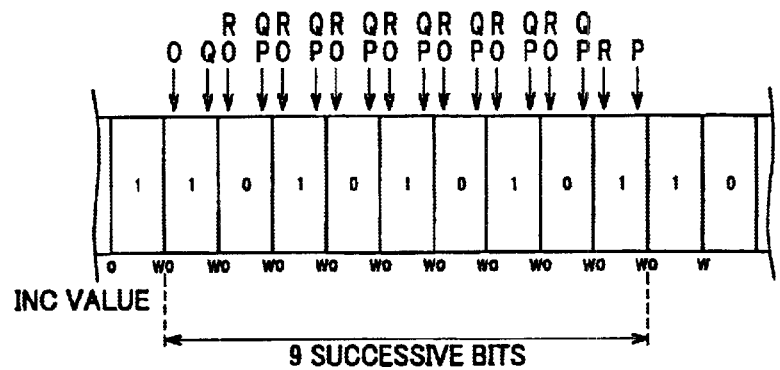
FIG. 16 shows "1" and "0" alternately laid in 9 successive bits.
Figure 16B:
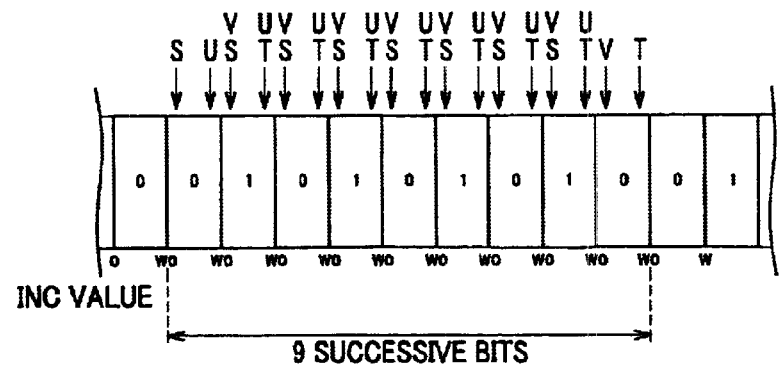

On the other hand, as shown in FIGS. 16(A) and 16(B), when "1" and "0" are laid in a 9-bit pattern, the ABS value decider 24 can decide none of the first to eighth bits to be "H" or "L" as the case may.

The 9-bit patterns of "1" and "0" include an array "110101011" as shown in FIG. 16(A) and an array "001010100" as shown in FIG. 16(B).

Concerning the array "110101011" as shown in FIG. 16(A), the ABS value is decided using the following procedure:

Since a micro-area adjacent to the first bit has the same code as that at the first bit when each of the ABS detectors $10_1$ to $10_8$ detects "10101010" from the first unstable area as indicated with an arrow "O", so the ABS value decider 24 can decide the first bit and thus the ABS value. Also, since a micro-area adjacent to the eighth bit has the same code as that at the eighth bit when each of the ABS detectors $10_1$ to $10_8$ detects "01010101" from the second unstable area as indicated an arrow "P", so the ABS value decider 24 can decide the eighth bit and thus the ABS value.

On the other hand, since the ABS value decider 24 can decide none of the first to eighth bits when each of the ABS detectors $10_1$ to $10_8$ detects "10101010" from the second unstable area as indicated with an arrow Q, it cannot decide any ABS value but it can only detect that the INC value is over k. Also, since the ABS value decider 24 can decide none of the first to eighth bits when each of the ABS detectors $10_1$ to $10_8$ detects "01010101" from the first unstable area as indicated with an arrow R, so it cannot decide any ABS value but it can only detect that the INC value is under j.

Therefore, the ABS value decider 24 can decide the ABS value by judging the ABS value as being "10101010" when it can decide none of the bits to be either "H" or "L" and the INC value is over k, and judging the ABS value as being "01010101" when it can decide none of the bits to be either "H" or "L" and the INC value is under j.

Concerning the array "001010100" as shown in FIG. 16(B), the ABS value is decided using the following procedure:

Since a micro-area adjacent to the first bit has the same code as that at the first bit when each of the ABS detectors $10_1$ to $10_8$ detects "01010101" from the first unstable area as indicated with an arrow "S", so the ABS value decider 24 can decide the first bit and thus the ABS value. Also, since a micro-area adjacent to the eighth bit has the same code as that at the eighth bit when each of the ABS detectors $10_1$ to $10_8$ detects "10101010" from the second unstable area as indicated an arrow "T", so the ABS value decider 24 can decide the eighth bit and thus the ABS value.

On the other hand, since the ABS value decider 24 can decide none of the first to eighth bits when each of the ABS detectors $10_1$ to $10_8$ detects "01010101" from the first unstable area as indicated with an arrow U, it cannot decide any ABS value but it can only detect that the INC value is over k. Also, since the ABS value decider 24 can decide none of the first to eighth bits when each of the ABS detectors $10_1$ to $10_8$ detects "10101010" from the second unstable area as indicated with an arrow V, so it cannot decide any ABS value but it can only detect that the INC value is under j.

Therefore, the ABS value decider 24 can decide the ABS value by judging the ABS value as being "01010101" when it can decide none of the bits to be either "H" or "L" and the INC value is over k, the ABS value decider 24 will decide that the ABS value is "10101010" and judging the ABS value as being "01010101" when it can decide none of the bits to be either "H" or "L" and the INC value is under j.

Figure 17:
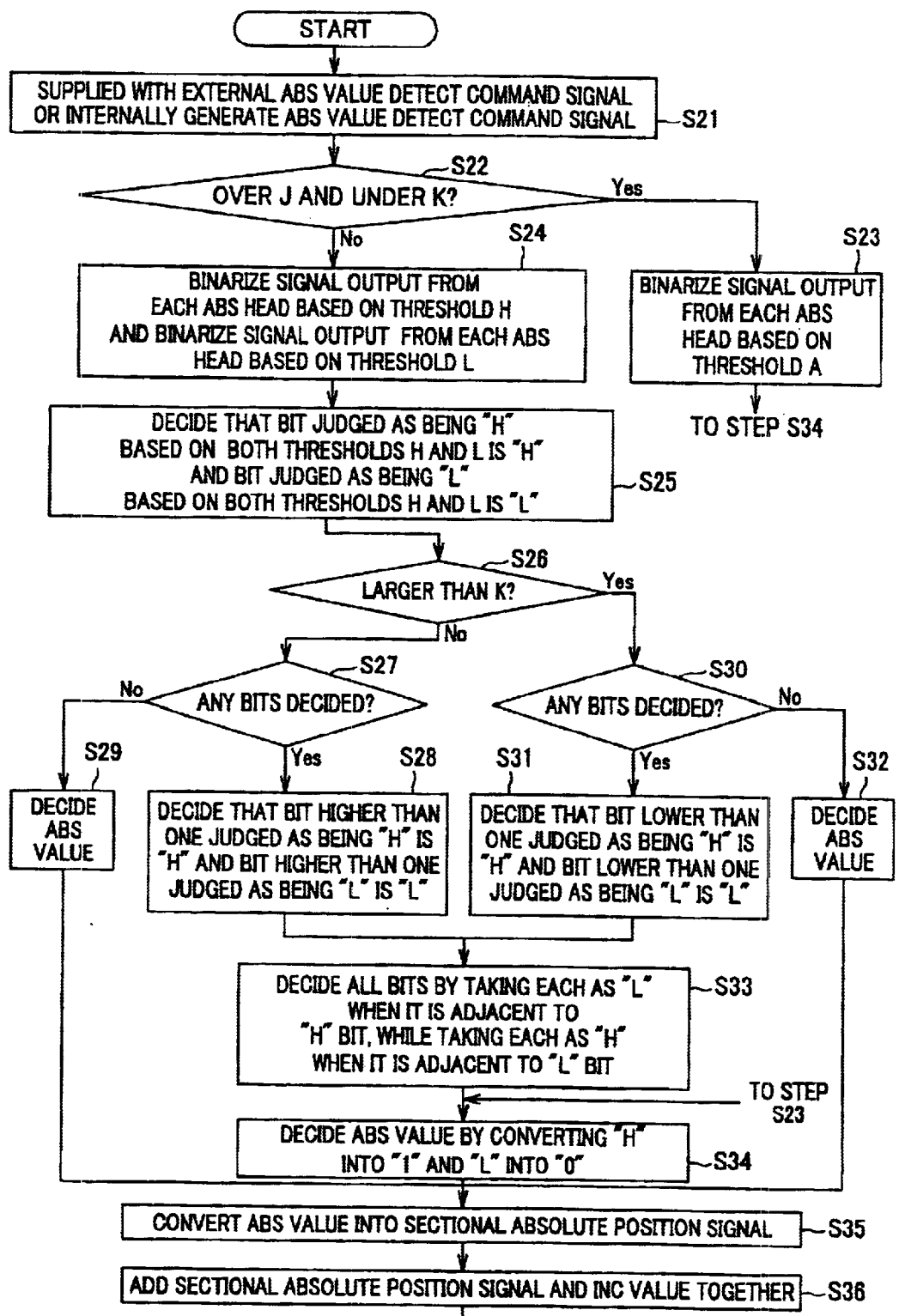
FIG. 17 shows a flow of operations made by the position transducer according to the present invention when a magnetic pattern in which "1" and "0" are alternately laid in 9 bits as an ABS track.

When adopting the ABS track 2 fonned from the pattern in which "1" and "0" are laid alternately in array at 9 bits, the linear encoder 1 functions as will be described below:

As shown in FIG. 17, first in step S21, the control block 26 is supplied with an external ABS value detect command signal or internally generates an ABS value detect command.

Next in step S22, the control block 26 judges whether the INC value decided by the INC value decider 20 is over j and under k. When the judgment is that the INC value is over j and under k. the control block 26 goes to step S23. If not, the control block goes to step S24.

In step S23, the threshold setter 21 sets the threshold for the binarization block 22 to a. Then, the binarization block 22 binarizes the signal outputs from the ABS detectors $10_1$ to $10_8$ to "H" and "L".

On the other hand, in step S24, the threshold setter 21 sets the threshold for the binarization block 22 to h, and then binarizes the signal outputs from the ABS detectors $10_1$ to $10_8$ to "H" and "L". Also, the threshold setter 21 sets the threshold for the binarization block 22 to 1, and then binarizes the signal outputs from the ABS detectors $10_1$ to $10_8$ to "H" and "L".

Then in step S25, the ABS value decider 24 decides that a bit is "H" when it has been judged as being "H" based on both the thresholds h and l and a bit is "L" when it has been judged as being "L" based on both the thresholds h and l.

Next in step S26, the control block 26 judges the INC value as being over k. When the INC value is over k, the control block 26 goes to step S27. When the INC value is under j, the control block 26 goes to step S30.

In step S27, the control block 26 judges whether there is any decided bit. When there is a decided bit, the control block 26 goes to step S28. When any bit has not yet been decided, the control block 26 goes to step S29.

In step S28, the ABS value detector 24 decides that a bit is "H" when it is higher than a one having been decided to be "H" and a bit is "L" when it is higher than a one having been decided to be "L".

In step S29, the ABS value decider 24 decides the ABS value based on the fact that the INC value is over k and there is no decided bit.

On the other hand, also in step S30, the control block 26 judges whether there is any decided bit. When there is a decided bit, the control block 26 goes to step S31. When any bit has not yet been decided, the control block 26 goes to step S32.

In step S31, the ABS value decider 24 decides that a bit is "H" when it is lower than a one having been decided to be "H" and a bit is "L" when it is lower than a one having been decided to be "L". Then it goes to step S33.

Also in step S32, the ABS value decider 24 decides the ABS value based on the fact that the INC value is over j and there is no decided bit.

Then in step S33, the ABS value decider 24 decides all bits to be either "H" or "L" by deciding that a bit is "L" when it is adjacent to a one having been decided to be "H" and has not yet been decided to be either "H" or "L" while deciding that a bit is "H" when it is adjacent to a one having been decided to be "L" and has no yet been decided to be either "H" or "L".

Next in step S34, the ABS value decider 24 decides an ABS value by converting "H" at each bit having been acquired in step S23, S28 or S30 into "1" and "L" so acquired into "0".

In step S35, the ABS value decider 24 converts each of the ABS values having been decided in steps S24, S29, S31 and S33 into a sectional absolute position signal on the basis of the data stored in the ROM.

Then in step S36, the computation block 25 adds the sectional absolute position signal and INC value together.

As having been explained above, the linear encoder 1 can detect the position of the ABS head 5 in relation to the ABS track 2 by modifying the operating sequence of the ABS value decider 24 or otherwise when the ABS track 2 is a pattern in which "1" and "0" are laid alternately in array at 9 bits.

Figure 18:
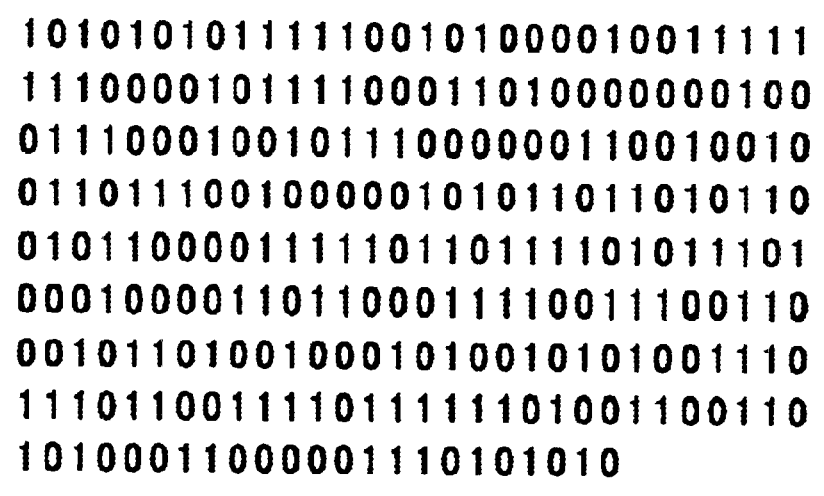

By adopting the pattern in which "1" and "0" are laid alternately in array at a maximum of 8 bits as the ABS track 2, the circuit configuration of the ABS value decider 24 and operating sequence can be simplified. Also, by using the patterns "10101010" and "01010101" outside the effective length of measurement, the ABS track 2 can be formed from an array of "1" and "0" laid alternately at a maximum of 8 bits. The an array of "1" and "0" laid alternately at a maximum of 8 bits includes a maximum periodic series generated by an eight-order primitive polynoininal taking "10101010" as an initial value as shown in FIG. 18.

In the foregoing, the present invention has been described concerning the embodiment in which an ABS value is represented by an 8-bit code. However, the present invention is not limited to this embodiment but can be implemented independently of the number of bits in the ABS value.

Also in the foregoing, the present invention has been described concerning the linear encoder. However, the present invention is applicable to any other type of position transducer than the linear encoder, for example, a rotary encoder.

Note that according to the present invention, the position transducer 1 may of an optical type, magnetic type or the like.

In case the optical transducer 1 is of an optical type, the ABS track 2 is formed from micro-areas including an area having the chrome deposition as "1" and an area having no chrome deposition as "0". A light emitting diode (LED) is used to emit light and a photo diode (PD) is also used to detect light reflection from, and light transmission through, the micro-areas. The INC track 3 may be a normally used one.

In case the optical transducer 1 is of a magnetic type, the ABS track 2 is fonned from non-magnetized micro-areas as "0" and magnetized micro-areas as "1". Each of the ABS detectors $10_1$ to $10_8$ fonned from two MR elements, is used to detect a magnetic field. In this case, the INC track 3 may be a normally used one.

The position transducer according to the present invention can accurately detect an n-bit signal by an absolute track head including n absolute track detectors even when it includes one absolute track. Therefore, the position transducer according to the present invention has a circuit thereof simplified, a compact design, ad can be produced with less costs.

Also, the position transducer according to the present invention can also detect the position of the absolute track head in relation to the absolute track when the absolute track detector is opposite to near the edge of a micro-area. Therefore, the position transducer according to the present invention cam detect the position of the absolute track head in relation to the absolute track independently of the position of the absolute track detector. Also, the position transducer according to the present invention can detect a n-bit code over the effective length of measurement of the absolute track. Further, the position transducer according to the present invention can detect the position of the first detector in relation to the absolute track with a high resolution.

In the foregoing, the present invention has been described in detail concerning certain preferred embodiments thereof as examples with reference to the accompanying drawings. However, it should be understood by those ordinarily skilled in the art that the present invention is not limited to the embodiments but can be modified in various manners, constructed alternatively or embodied in various other forms without departing from the scope and spirit thereof as set forth and defined in the appended claims.

What is claimed is:

1. A position transducer comprising:

an absolute track in which micro-areas each represented by "0" and micro-areas each represented by "1" when two types of micro-areas different in physical property from each other are represented by either of two codes "0" and "1" are laid in array to provide an n-bit code (n is a natural number);

an incremental track whose physical property varies in a constant cycle;

an absolute track head having n detectors laid in array oppositely to the absolute track and which is movable in relation to the absolute track to detect the physical property of the absolute track;

an incremental track head having detectors opposite to the incremental track to detect the physical property of the incremental track;

a sorting means for binarizing the values of signal outputs from the absolute track detectors to "H" and "L" based on a first threshold h and also to "H" and "L" based on a second threshold l (h>l) and then sorting the signal values into signal values having been judged as being "H" or "L" both when the signal outputs are binarized based on the first threshold h and when they are binarized based on the second threshold l and signal values having been judged as being "L" when they are binarized based on the first threshold h and as being "H" when they are binarized based on the second threshold l;

an interpolation means for segmenting, within a micro-area, the position of the absolute track head in relation to the absolute track given by the n-bit code on the basis of the signal output from the incremental track detector; and a code deciding means for deciding the n-bit code based on the signal having been judged by the sorting means as being lower than l or over h and the result of the segmentation by the interpolation means.

2. The apparatus as set forth in claim 1, wherein the absolute track is formed from a pattern of micro-areas each represented by "0" and micro-areas each represented by "1", laid in array such that there will not be formed more than two areas in which more than n micro-areas represented by "0" and "1" are successively laid alternately.

* * * * *

UNITED STATES PATENT AND TRADEMARK OFFICE
CERTIFICATE OF CORRECTION

PATENT NO. : 6,693,565 B2
DATED : February 17, 2004
INVENTOR(S) : Kusumi et al.

It is certified that error appears in the above-identified patent and that said Letters Patent is hereby corrected as shown below:

Column 6,
Lines 39 and 49, replace "infonnation" with -- information --.

Signed and Sealed this

Twenty-first Day of March, 2006

JON W. DUDAS
*Director of the United States Patent and Trademark Office*